US012746944B2

(12) United States Patent
Yang et al.

(10) Patent No.: US 12,746,944 B2
(45) Date of Patent: Sep. 29, 2026

(54) PREVENTION OF TRAFFIC OBSTRUCTIONS USING ARTIFICIAL INTELLIGENCE SYSTEMS IN AUTOMOTIVE VEHICLE APPLICATIONS

(71) Applicant: Waymo LLC, Mountain View, CA (US)

(72) Inventors: Qichi Yang, Foster City, CA (US); Ming Ji, Palo Alto, CA (US); Pan Li, Fremont, CA (US); Jingwei Ji, Santa Clara, CA (US); Zijian Guo, Palo Alto, CA (US); Di Huang, Mountain View, CA (US)

(73) Assignee: Waymo LLC

( * ) Notice: Subject to any disclaimer, the term of this patent is extended or adjusted under 35 U.S.C. 154(b) by 0 days.

(21) Appl. No.: 19/082,835

(22) Filed: Mar. 18, 2025

(65) Prior Publication Data

US 2026/0285357 A1 Sep. 24, 2026

(51) Int. Cl.

| | |
|---|---|
| ***B60W 60/00*** | (2020.01) |
| ***G06F 40/20*** | (2020.01) |
| ***G06N 3/0475*** | (2023.01) |

(52) U.S. Cl.

CPC ........... *B60W 60/001* (2020.02); *G06F 40/20* (2020.01); *G06N 3/0475* (2023.01); *B60W 2420/403* (2013.01); *B60W 2420/408* (2024.01); *B60W 2554/402* (2020.02); *B60W 2556/45* (2020.02)

(58) Field of Classification Search

CPC ......... B60W 60/001; B60W 2420/403; B60W 2420/408; B60W 2554/402; B60W 2556/45; G06F 40/20; G06N 3/0475

See application file for complete search history.

(56) References Cited

U.S. PATENT DOCUMENTS

| | | | | |
|---|---|---|---|---|
| 9,633,564 | B2 * | 4/2017 | Ferguson | G01C 21/32 |
| 2014/0088855 | A1 * | 3/2014 | Ferguson | G01C 21/3819 701/117 |
| 2016/0139594 | A1 * | 5/2016 | Okumura | B60W 30/00 701/2 |
| 2016/0358475 | A1 * | 12/2016 | Prokhorov | G05D 1/0022 |
| 2021/0237795 | A1 * | 8/2021 | Wenk | B62D 5/0451 |
| 2021/0240190 | A1 * | 8/2021 | Wray | B60W 60/0011 |

* cited by examiner

*Primary Examiner* — Richard M Camby

(74) *Attorney, Agent, or Firm* — Van Hoven PC; Jordan Becker

(57) ABSTRACT

The disclosed systems and techniques are directed to evaluation of suitability of stopping locations of a vehicle using a generative AI model. The disclosed techniques include collecting, using a sensing system, sensing data for a driving environment of the vehicle and generating a prompt for a generative artificial intelligence (AI) model. The prompt includes spatial data characterizing the driving environment, including the sensing data and/or spatial arrangement of object(s) identified based on the sensing data and a request to determine, using the spatial data, whether the vehicle is obstructing traffic. The techniques further include causing the generative AI model to process the prompt and generate a response indicating that the vehicle is obstructing traffic and causing the vehicle to be repositioned to avoid obstructing traffic in the driving environment.

21 Claims, 7 Drawing Sheets

PREVENTION OF TRAFFIC OBSTRUCTIONS USING ARTIFICIAL INTELLIGENCE SYSTEMS IN AUTOMOTIVE VEHICLE APPLICATIONS

TECHNICAL FIELD

The instant specification generally relates to autonomous vehicles. More specifically, the instant specification relates to identification and prevention of driving situations where an autonomous vehicle may block traffic.

BACKGROUND

An autonomous (fully or partially autonomous) vehicle (AV) operates by sensing an outside environment with various electromagnetic (e.g., radar and optical) and non-electromagnetic (e.g., audio and humidity) sensors. Some autonomous vehicles chart a driving path through the environment based on the sensed data. The driving path can be determined based on Global Navigation Satellite System (GNSS) data and road map data. While the GNSS and the road map data can provide information about static aspects of the environment (buildings, street layouts, road closures, etc.), dynamic information (such as information about other vehicles, pedestrians, street lights, etc.) is obtained from contemporaneously collected sensing data. Precision and safety of the driving path and of the speed regime selected by the autonomous vehicle depend on timely and accurate identification of various objects present in the outside environment and on the ability of a driving algorithm to process the information about the environment and to provide correct instructions to the vehicle controls and the drivetrain.

BRIEF DESCRIPTION OF THE DRAWINGS

The present disclosure is illustrated by way of examples, and not by way of limitation, and can be more fully understood with references to the following detailed description when considered in connection with the figures, in which.

SUMMARY

Figure 1:
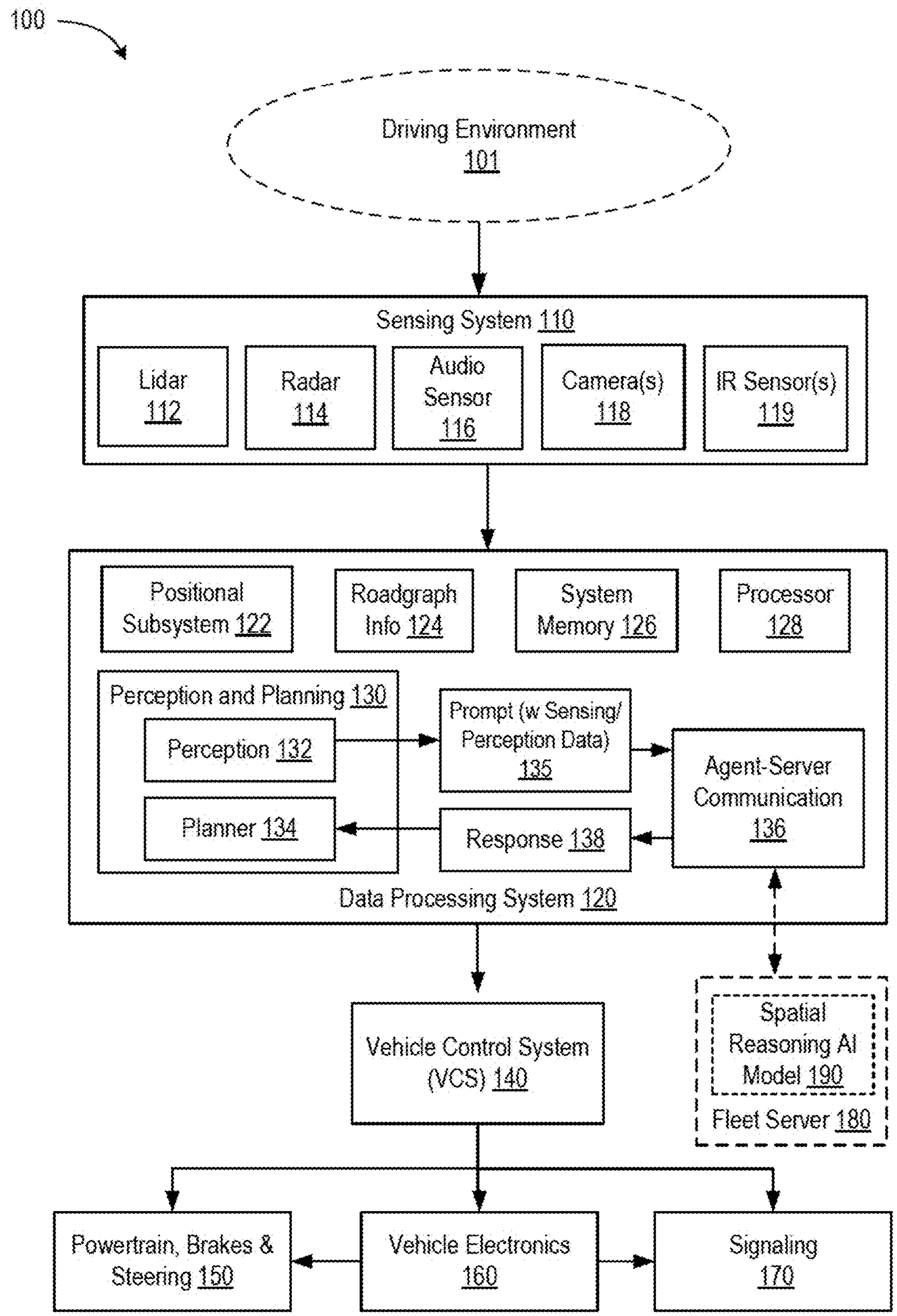
FIG. 1 is a diagram illustrating components of an example autonomous vehicle (AV) deploying systems and techniques capable of efficient evaluation of suitability of stopping locations using a generative artificial intelligence (AI) model, in accordance with some implementations of the present disclosure.

In one implementation, disclosed is an autonomous vehicle having a sensing system, a data processing system, an autonomous vehicle control system. The sensing system is to collect sensing data for a driving environment of the autonomous vehicle. The data processing system is to generate a prompt for a generative artificial intelligence (AI) model, the prompt including spatial data characterizing the driving environment. The spatial data includes at least one of (i) the sensing data, or (ii) spatial arrangement of one or more objects in the driving environment identified based on the sensing data, and a request to determine, using the spatial data, whether the autonomous vehicle is obstructing traffic in the driving environment. The data processing system is to cause the generative AI model to process the prompt and generate a response indicating that the autonomous vehicle is obstructing traffic in the driving environment. The autonomous vehicle control system is to reposition, responsive to the generated response, the autonomous vehicle to avoid obstructing traffic in the driving environment memory.

In one implementation, disclosed is a system that includes a sensing system of a vehicle, a data processing system of a vehicle, a computing device external to the vehicle, and a control system of the vehicle. The sensing system of the vehicle is to collect sensing data for a driving environment of the vehicle. The data processing system of the vehicle is to generate a prompt for a generative AI model, the prompt including spatial data characterizing the driving environment. The spatial data includes at least one of (i) the sensing data, or (ii) spatial arrangement of one or more objects in the driving environment identified based on the sensing data, and a request to determine, using the spatial data, whether the autonomous vehicle is obstructing traffic in the driving environment. The computing device external to the vehicle is to apply the generative AI model to the prompt to generate an AI model response indicating that the vehicle is obstructing traffic in the driving environment and communicate the AI model response to the vehicle. The control system of the vehicle is to cause, responsive to the AI response, to reposition the vehicle to avoid obstructing traffic in the driving environment.

In another implementation, disclosed is method that includes collecting, using a sensing system of a vehicle, sensing data for a driving environment of the vehicle and generating a prompt for a generative artificial intelligence (AI) model, the prompt including spatial data characterizing the driving environment. The spatial data includes comprises at least one of (i) the sensing data or (ii) spatial arrangement of one or more objects in the driving environment identified based on the sensing data, and a request to determine, using the spatial data, whether the vehicle is obstructing traffic in the driving environment. The method further includes causing the generative AI model to process the prompt and generate a response indicating that the vehicle is obstructing traffic in the driving environment and causing, responsive to the generated response, a control system of the vehicle to reposition the vehicle to avoid obstructing traffic in the driving environment.

DETAILED DESCRIPTION

An autonomous vehicle (AV) or a vehicle deploying various driver assistance features can use multiple sensor modalities to facilitate detection and identification of objects in the driving environments and tracking trajectories of these objects. Sensors can include radio detection and ranging (radar) sensors, light detection and ranging (lidar) sensors, multiple digital cameras, sonars, geolocation sensors, positional sensors, and the like. Different types of sensors can provide different and complementary benefits. For example, radars and lidars emit electromagnetic signals (radio signals or optical signals) that reflect from the objects and carry back information about distances to the objects (e.g., from the time of flight of the signals) and velocities of the objects (e.g., from the Doppler shift of the frequencies of the reflected signals). Radars and lidars can scan an entire 360-degree view by using a series of consecutive sensing frames. Sensing frames can include numerous reflections covering the outside environment in a dense grid of return points. Each return point can be associated with the distance to the corresponding reflecting object and a radial velocity (a component of the velocity along the line of sight) of the reflecting object.

Lidars, by virtue of their sub-micron optical wavelengths, have high spatial resolution, which allows obtaining many closely spaced return points from the same object. This enables accurate detection and tracking of objects once the objects are within the reach of lidar sensors. Lidars have an operating range of 150-350 m, depending on a specific lidar model, with higher ranges typically achieved by more powerful and expensive systems.

Radar sensors are inexpensive, require less maintenance than lidar sensors, have a large working range of distances, and have a good tolerance of adverse weather conditions. As a result of much longer (radio) wavelengths used by radars, resolution of radar data is much lower than that of lidars. In particular, while radars are capable of accurate determination of velocities of objects moving with not too small velocities (relative to the radar receiver), detecting accurate locations of objects can be often problematic.

Cameras (e.g., photographic or video cameras) can acquire high resolution images at both shorter distances (where lidars operate) and longer distances (where lidars do not reach. Cameras capture two-dimensional projections of the three-dimensional outside space onto an image plane (or some other non-planar imaging surface). Cameras have a longer, than lidars, operating range but determine positions of objects with a higher error along the radial direction compared with the lateral directions.

Camera and lidar images (as well as radar images, in some applications) can be processed by various object detection models, including deep learning neural network models. Such models can determine positions and orientations of objects and evolution of the positions and orientations of the objects with time. These models can further classify the objects by type (e.g., truck, car, school bus, motorcyclist, pedestrian, and/or the like), manufacturer, model, and/or the like.

AVs, especially those used in urban environments, often have to park (in what is sometimes referred to as offhail parking) between driving missions, e.g., between passenger rides, to reduce operational costs and/or not to contribute to traffic during the time of inactivity or stop after detecting a collision or another road incident, to receive rerouting instructions or technical assistance, to respond to a request from a passenger, and/or the like. Locations for such parked/stopped vehicles have to be selected in a way that ensures that the AV avoids obstructing traffic, e.g., as a result of stopping on a narrow street or lane, near a driveway, pedestrian crossing, and/or other unsuitable places. A variety of situations that can make a particular location unsuitable for stopping in a typical urban environment is very large and includes complex roadway geometries, presence of other vehicles, businesses, sidewalks, driveways, crossings, overpasses, and/or the like. Existing on-board perception systems of AVs can be overwhelmed by a multitude of possible scenarios given limited amounts of processing resources available to such perception systems. In view of undesirable consequences of erroneous blocking of traffic, navigation of AV stoppages presently involves requesting remote assistance of a human operator (e.g., dispatcher) serving a fleet of AVs. In particular, such a remote assistant may receive images of a driving environment of the AV and determine if the AV is currently blocking traffic or is in a location that is likely to cause traffic obstructions within a short period of time (e.g., a vehicle entering or exiting a parking lot driveway). If the remote assistant determines that the AV is obstructing or about to obstruct traffic, the remote assistant may direct the AV to move to a different location. If the remote assistant determines that the AV avoids obstructing traffic and unlikely to obstruct traffic within a certain time horizon (e.g., 10-30 seconds), the AV may remain in its current location. In any such instances, the remote assistant may have to review previously made decisions, e.g., to confirm that the AV is still not blocking traffic or assess a new location to where the AV may have moved from an earlier unsuitable location. As modern AV fleets include progressively larger numbers of vehicles (agents), human remote assistants have to do a large amount of decision-making at relatively short times, which may be difficult especially in situations where multiple AVs need assistance simultaneously.

Aspects and implementations of the instant disclosure address these and other challenges of the existing autonomous driving technology by providing for systems and techniques capable of more efficient evaluation of suitability of stopping locations for autonomous vehicles with less reliance on human operator decision-making. More specifically, in some implementations, an AV stopped at a particular location can perform an initial heuristics-based classification of the stopping location and a state of the driving environment in the vicinity of that stopping location. Such heuristics can include presence or absence of another vehicle (moving or stopped) whose driving path likely intersects with the current location of the AV, distances to the opposite edge of the street, median, lane boundaries, presence or absence of driveways, pedestrian crossings, proximity to traffic lights, road signs, and/or the like. The heuristics-based classification can classify situations among multiple classes by the likelihood of obstruction, e.g., “high,” “medium,” “low,” and/or the like. In the instances of a high probability of obstruction, an autonomous driving control system of the AV can be directed to move the AV from the current location. In the instances of a medium probability of obstruction, a perception and planning system of the AV can initiate communication with a remote assistant who can then decide whether the AV is to stay in the current location, move away from it, or otherwise reposition itself relative to the driving environment. In the instances of a low probability of obstruction (or when the remote assistant determines that the AV may stay at the current location), the perception and planning system can collect various sensing data representative of the driving environment of the AV and include the collected data into a prompt for an artificial intelligence (AI) model, which can be a vision language model (VLM), or some other model capable of spatial reasoning. For example, the sensing data can include any, some, or all of raw camera/lidar/radar data for the driving environment, one or more objects identified (e.g., by the perception system) as being depicted in the sensing data, one or more partially processed feature vectors (embeddings) representative of the one or more objects, and/or the like, or some combination thereof. The AI model can be located on a fleet server (e.g., dispatch server) having significantly more powerful computations (e.g., processing and/or memory) resources than may be available on the AV. The AI model can be trained with a large dataset of training data depicting numerous instances of vehicles stopped at locations that obstruct traffic and locations that do not obstruct traffic. The AI model can quickly process the prompt and the supplied data and determine whether the AV at the current location is obstructing or likely to obstruct traffic in the immediate future (e.g., several seconds and/or the like). If the obstruction determination is made, the autonomous driving control system of the AV can move the AV from the current location. If the non-obstruction determination is made, the AV can remain in the current location. The perception and planning system can then initiate a new determination by the AI model and/or the heuristics-based classifier after a certain set time, e.g., 10-30 seconds.

Various other implementations are disclosed herein. The advantages of the disclosed techniques and systems include, but are not limited to, faster and more efficient identification and resolution of situations where a parked and/or stopped autonomous vehicle may be obstructing traffic, about to obstruct traffic, and/or likely to obstruct traffic in the near future. On the other hand, handling of traffic obstructions and/or potential traffic obstructions is performed in a way that significantly eliminates false positive determinations where the autonomous vehicle is forced to leave its current location while the likelihood of obstruction is low. The disclosed techniques also include mechanisms for efficient monitoring of driving environments to facilitate quick responses by an autonomous vehicle to changing conditions so that situations that call for moving the autonomous vehicle are resolved quickly and without continuous reliance on human decision-making.

In those instances where description of implementations refers to autonomous vehicles, it should be understood that similar techniques can be used in various driver assistance systems that do not rise to the level of fully autonomous driving systems. More specifically, disclosed techniques can be used in Level 2 driver assistance systems that implement steering, braking, acceleration, lane centering, adaptive cruise control, etc., as well as other driver support. Likewise, the disclosed techniques can be used in Level 3 driving assistance systems capable of autonomous driving under limited (e.g., highway) conditions. In such systems, assessing stopping locations of a vehicle equipped with a driver assistance system can be used to inform the driver that the stopped vehicle blocks traffic at its current location even in situations where the driver retains ultimate control over driving decisions.

FIG. 1 is a diagram illustrating components of an example autonomous vehicle (AV) 100 deploying systems and techniques capable of efficient evaluation of suitability of stopping locations using a generative AI model, in accordance with some implementations of the present disclosure. Although, for brevity and conciseness, reference herein is made to "stopping," the same or substantially similar techniques can be used with parked vehicles (e.g., vehicles with engines turned off), stopped vehicles (e.g., vehicles with engines idling), vehicles pulled over to the side of a roadway to receive dispatch instructions, determine routing, awaiting technical or maintenance support, and/or any other stationary vehicles that are not currently moving other than for reasons of complying with traffic light signals, road signs, requests from authority personnel, construction workers in construction zones, and/or the like. Autonomous vehicles (also sometimes referred to as "agents" herein) can include motor vehicles, such as cars, trucks, semi-trucks, buses, motorcycles, all-terrain vehicles, recreational vehicles, any specialized farming or construction vehicles, and the like, or any other self-propelled vehicles, such as e.g., robots, factory or warehouse robotic vehicles, sidewalk delivery robotic vehicles, etc., capable of being operated in a self-driving mode or partially self-driving mode (without a human input or with a reduced human input). "Objects," as referenced herein, can include any entity, item, device, body, or article (animate or inanimate) located outside the stopped vehicle, such as roadways, buildings, road signs, trees, bushes, sidewalks, bridges, mountains, other vehicles, piers, banks, landing strips, animals, birds, or other things.

A driving environment 101 can be urban, suburban, rural, and or the like. In some implementations, the driving environment 101 can be an off-road environment (e.g., farming or other agricultural land). In some implementations, the driving environment can be an indoor environment, e.g., the environment of an industrial plant, a shipping warehouse, a hazardous area of a building, and so on. In some implementations, the driving environment 101 can be substantially flat, with various objects moving parallel to the ground. In other implementations, the driving environment can be three-dimensional and can include objects that are capable of moving along all three directions (e.g., balloons, leaves, etc.). Hereinafter, the term "driving environment" should be understood to include all environments in which an autonomous motion of self-propelled vehicles can operate. The objects of the driving environment 101 can be located at any distance from the AV, from close distances of several feet (or less) to several miles (or more).

As described herein, in a semi-autonomous or partially autonomous driving mode, even though the vehicle assists with one or more driving operations (e.g., steering, braking and/or accelerating to perform lane centering, adaptive cruise control, advanced driver assistance systems (ADAS), or emergency braking), the human driver is expected to be situationally aware of the vehicle's surroundings and supervise the assisted driving operations. In such driving mode(s), even though the vehicle may perform all driving tasks in certain situations, the human driver is expected to be responsible for taking control as needed.

Although, for brevity and conciseness, various systems and methods may be described below in conjunction with autonomous vehicles, similar techniques can be used in various driver assistance systems that do not rise to the level of fully autonomous driving systems. In the United States, the Society of Automotive Engineers (SAE) have defined different levels of automated driving operations to indicate how much, or how little, a vehicle controls the driving, although different organizations, in the United States or in other countries, May categorize the levels differently. More specifically, disclosed systems and methods can be used in SAE Level 2 (L2) driver assistance systems that implement steering, braking, acceleration, lane centering, adaptive cruise control, etc., as well as other driver support. The disclosed systems and methods can be used in SAE Level 3 (L3) driving assistance systems capable of autonomous driving under limited (e.g., highway) conditions. Likewise, the disclosed systems and methods can be used in vehicles that use SAE Level 4 (L4) self-driving systems that operate autonomously under most regular driving situations and require only occasional attention of the human operator. In all such driving assistance systems, accurate assessment of the driving environment can be performed automatically without a driver input or control (e.g., while the vehicle is in motion) and result in improved reliability of vehicle positioning and navigation and the overall safety of autonomous, semi-autonomous, and other driver assistance systems. As previously noted, in addition to the way in which SAE categorizes levels of automated driving operations, other organizations, in the United States or in other countries, may categorize levels of automated driving operations differently. Without limitation, the disclosed systems and methods herein can be used in driving assistance systems defined by these other organizations' levels of automated driving operations.

The example AV 100 can be an agent of a fleet of AVs supported by a fleet server 180, which can be a server that dispatches instructions (e.g., generated by a human assistant and/or computer-generated) to individual agents of the fleet, performs computations for the agents that are too complex and/or too long to be performed using the agents' on-board computing resources, updates dynamic map (roadgraph) and/or traffic information based on information collected from the agents, which can be filtered, processed, combined, and/or the like, and then distributes the collected information among the agents. (Dashed boxes in FIG. 1 indicate components that can be located outside the AV 100.)

The example AV 100 can include a sensing system 110. The sensing system 110 can include various electromagnetic (e.g., optical) and non-electromagnetic (e.g., acoustic) sensing subsystems and/or devices. The sensing system 110 can include a radar 114 (or multiple radars 114), which can be any system that utilizes radio or microwave frequency signals to sense objects within the driving environment 101 of the AV 100. The radar(s) 114 can be configured to sense both the spatial locations of the objects (including their spatial dimensions) and velocities of the objects (e.g., using the Doppler shift technology). Hereinafter, "velocity" refers to both how fast the object is moving (the speed of the object) as well as the direction of the object's motion. The sensing system 110 can include a lidar 112, which can be a laser-based unit capable of determining distances to the objects and velocities of the objects in the driving environment 101. Each of the lidar 112 and radar 114 can include a coherent sensor, such as a frequency-modulated continuous-wave (FMCW) lidar or radar sensor. For example, radar 114 can use heterodyne detection for velocity determination. In some implementations, the functionality of a ToF and coherent radar is combined into a radar unit capable of simultaneously determining both the distance to and the radial velocity of the reflecting object. Such a unit can be configured to operate in an incoherent sensing mode (ToF mode) and/or a coherent sensing mode (e.g., a mode that uses heterodyne detection) or both modes at the same time. In some implementations, multiple lidars 112 or radars 114 can be mounted on AV 100.

Lidar 112 can include one or more light sources producing and emitting signals and one or more detectors of the signals reflected back from the objects. In some implementations, lidar 112 can perform a 360-degree scanning in a horizontal direction. In some implementations, lidar 112 can be capable of spatial scanning along both the horizontal and vertical directions. In some implementations, the field of view can be up to 90 degrees in the vertical direction (e.g., with at least a part of the region above the horizon being scanned with radar signals). In some implementations, the field of view can be a full sphere (consisting of two hemispheres).

The sensing system 110 can further include one or more cameras 118 to capture images of the driving environment 101. The images can be two-dimensional projections of the driving environment 101 (or parts of the driving environment 101) onto a projecting surface (flat or non-flat) of the camera(s). Some of the cameras 118 of the sensing system 110 can be video cameras configured to capture a continuous (or quasi-continuous) stream of images of the driving environment 101. The sensing system 110 can also include one or more infrared (IR) sensors 119. The sensing system 110 can further include one or more audio sensors 116, such as microphones, sonars, which can be ultrasonic sonars, and/or other audio sensors, in some implementations.

The sensing data obtained by the sensing system 110 can be processed by a data processing system 120 of AV 100. For example, the data processing system 120 can include a perception and planning system 130. The perception and planning system 130 can be configured to detect and track objects in the driving environment 101 and to classify (recognize, identify) the detected objects, e.g., vehicles, pedestrians, animals, and/or the like. The perception and planning system 130 can also analyze images captured by the cameras 118 and can detect traffic light signals, road signs, roadway layouts (e.g., boundaries of traffic lanes, topologies of intersections, designations of parking places, and so on), presence of obstacles, and the like. The perception and planning system 130 can further receive radar sensing data (Doppler data and ToF data) to determine distances to various objects in the driving environment 101 and velocities (radial and, in some implementations, transverse, as described below) of such objects. In some implementations, the perception and planning system 130 can use radar data in combination with the data captured by the camera(s) 118.

Perception and planning system 130 can receive additional information from a positioning subsystem 122, which can include a GNSS transceiver and/or inertial measurement unit (IMU), configured to obtain information about the position of the AV relative to Earth and its surroundings. The positioning subsystem can use the positioning data, e.g., GNSS and IMU data) in conjunction with the sensing data to help accurately determine the location of the AV with respect to fixed objects of the driving environment 101 (e.g., roadways, lane boundaries, intersections, sidewalks, crosswalks, road signs, curbs, surrounding buildings, etc.) whose locations can be provided by roadgraph information 124. In some implementations, the data processing system 120 can receive non-electromagnetic data, such as audio data (e.g., ultrasonic sensor data, or data from a mic picking up emergency vehicle sirens), temperature sensor data, humidity sensor data, pressure sensor data, meteorological data (e.g., wind speed and direction, precipitation data), and the like.

Perception and planning system 130 can perform any number of tasks related to selecting and following a selected trajectory (driving path) of AV 100, including detection and tracking of objects in the driving environment, identifying status of traffic lights, traffic signs, road/lane markings, selecting a safe and legal trajectory for the AV 100, modifying the selected trajectory in view of changing driving conditions, and/or any performing various other tasks related to the motion of AV 100. Additionally, perception and planning system 130 can perform any number of tasks in conjunction with collecting and processing live data related to determining suitability of various locations for hosting stopped AV 100. In some implementations, collecting and processing stopping location suitability can be performed by the same modules and processes that perform various trajectory-associated tasks. In some implementations, assessing stopping location suitability can be performed by specialized modules and processes that are dedicated to such tasks.

In some implementations, a perception module 132 can process sensing data received from sensing system 110 and generate a prompt 135 for a spatial reasoning AI model 190 to assess the current location of the stopped AV 100 in view of the current state of the driving environment 101. Prompt 135 can include (or be associated with) various additional information that can be used by the spatial reasoning AI model 190 in performing the assessments, such as raw camera/lidar/radar imaging data for the driving environment 101, object(s) identified by the perception and planning system 130 as being depicted or otherwise represented in the sensing data, feature vectors (partially processed condensed digital representations) of the identified object(s), and/or the like.

Prompt 135 and various additional information can be provided to an agent-server communication module 136 that communicates the data to fleet server 180. Agent-server communication module 136 can include a radio signal transmitter capable of transmitting modulated radio waves carrying pertinent data (e.g., prompt 135, etc.) and a radio signal receiver capable of receiving modulated radio waves carrying a response 138, e.g., using one or more suitable radio communication protocols. In some implementations, transmitting and/or receiving radio waves can be performed by a transceiver that combines functions of the transmitter and the receiver.

In some implementations, language model 190 can process the prompt 135 and various additional data and determine whether the AV 100 is obstructing traffic (e.g., partially or fully blocking at least some drivable portion of the roadway) or likely to be obstructing traffic within a certain time horizon, e.g., 10 seconds, 20 seconds, 30 seconds, and so on. In some implementations, the determination can be binary, e.g., "obstructing" or "not obstructing" (or any equivalent). In some implementations, the determination can be non-binary, e.g., continuous, including a probability P (or log-probability) that the AV 100 is obstructing traffic and/or likely to obstruct it within the time horizon, which can be a number between 0 (not obstructing) and 1 (obstructing), or a number in any other range of values. The received response 138 can be passed on to a planner module 134 of perception and planning system 130. In the instances of positive obstruction determination, the planner module 134 can chart a driving trajectory for AV 100 to relocate to a different stopping location. In the instances of negative obstruction determination, the planner module 134 can schedule another reevaluation of the current stopping location after a set duration, e.g., 10 seconds, 20 seconds, and/or the like.

Various systems and subsystems of data processing system 120 can have software stored in one or more system memory 126 devices. System memory 126 can include any volatile or non-volatile memory devices, such as read-only memory (ROM), random-access memory (RAM), electrically erasable programmable read-only memory (EEPROM), flash memory, flip-flop memory, or any other device capable of storing data. RAM can be a dynamic random-access memory (DRAM), synchronous DRAM (SDRAM), a static memory, such as static random-access memory (SRAM), and/or the like. In some implementations, system memory 126 can be an on-chip memory.

Operations of data processing system 120 can be performed by one or more processors 128, which can include CPU(s), GPU(s), field-programmable gate arrays (FPGAs), application-specific integrated circuits (ASICs), and the like. "Processor" herein refers to a device capable of executing instructions encoding arithmetic, logical, or I/O operations, e.g., stored in system memory 126. In some implementations, processor(s) 128 and the system memory 126 can be implemented as a single controller, e.g., as an FPGA.

The data generated by the perception and planning system 130 and/or received via agent-server communication module 136 can be used by an autonomous driving system, such as a vehicle control system (VCS) 140. The VCS 140 can include one or more algorithms that control how AV is to behave in various driving situations and environments. For example, the VCS 140 can include a navigation system for determining a global driving route to a destination point. The VCS 140 can also include a driving path selection system for selecting a particular path through the immediate driving environment, which can include selecting a traffic lane, negotiating a traffic congestion, choosing a place to make a U-turn, selecting a trajectory for a parking maneuver, and so on. The VCS 140 can also include an obstacle avoidance system for safe avoidance of various obstructions (rocks, stalled vehicles, a jaywalking pedestrian, and so on) within the driving environment of the AV. The obstacle avoidance system can be configured to evaluate the size of the obstacles and the trajectories of the obstacles (if obstacles are animated) and select an optimal driving strategy (e.g., braking, steering, accelerating, etc.) for avoiding the obstacles.

Algorithms and modules of VCS 140 can generate instructions for various systems and components of the vehicle, such as the powertrain, brakes, and steering 150, vehicle electronics 160, signaling 170, and other systems and components not explicitly shown in FIG. 1. The powertrain, brakes, and steering 150 can include an engine (internal combustion engine, electric engine, and so on), transmission, differentials, axles, wheels, steering mechanism, and other systems. The vehicle electronics 160 can include an on-board computer, engine management, ignition, communication systems, carputers, telematics, in-car entertainment systems, and other systems and components. The signaling 170 can include high and low headlights, stopping lights, turning and backing lights, horns and alarms, inside lighting system, dashboard notification system, passenger notification system, radio and wireless network transmission systems, and so on. Some of the instructions outputted by the VCS 140 can be delivered directly to the powertrain, brakes, and steering 150 (or signaling 170) whereas other instructions outputted by the VCS 140 are first delivered to the vehicle electronics 160, which generates commands to the powertrain, brakes, and steering 150 and/or signaling 170.

In one example, once response 138 is received that the current location is unsuitable for the AV 100, the planner module 134 can access a map of driving environment 101, including dynamic updates received from fleet server 180 and identify a new location to which the AV 100 can be moved. Planner module 134 can then chart a driving path from the current location to the new location and provide the charted driving path or route to VCS 140, e.g., by specifying various waypoints along the route, target speed to be maintained between the waypoints, and/or the like. The VCS 140 can output corresponding instructions to the powertrain, brakes, and steering 150 (directly or via the vehicle electronics 160), e.g., to (1) follow the provided driving path by controlling throttle settings, a flow of fuel to the engine, steering settings, and/or the like, (2) brake, downshift transmission into a lower gear, and (3) move into the new location.

Figure 2:
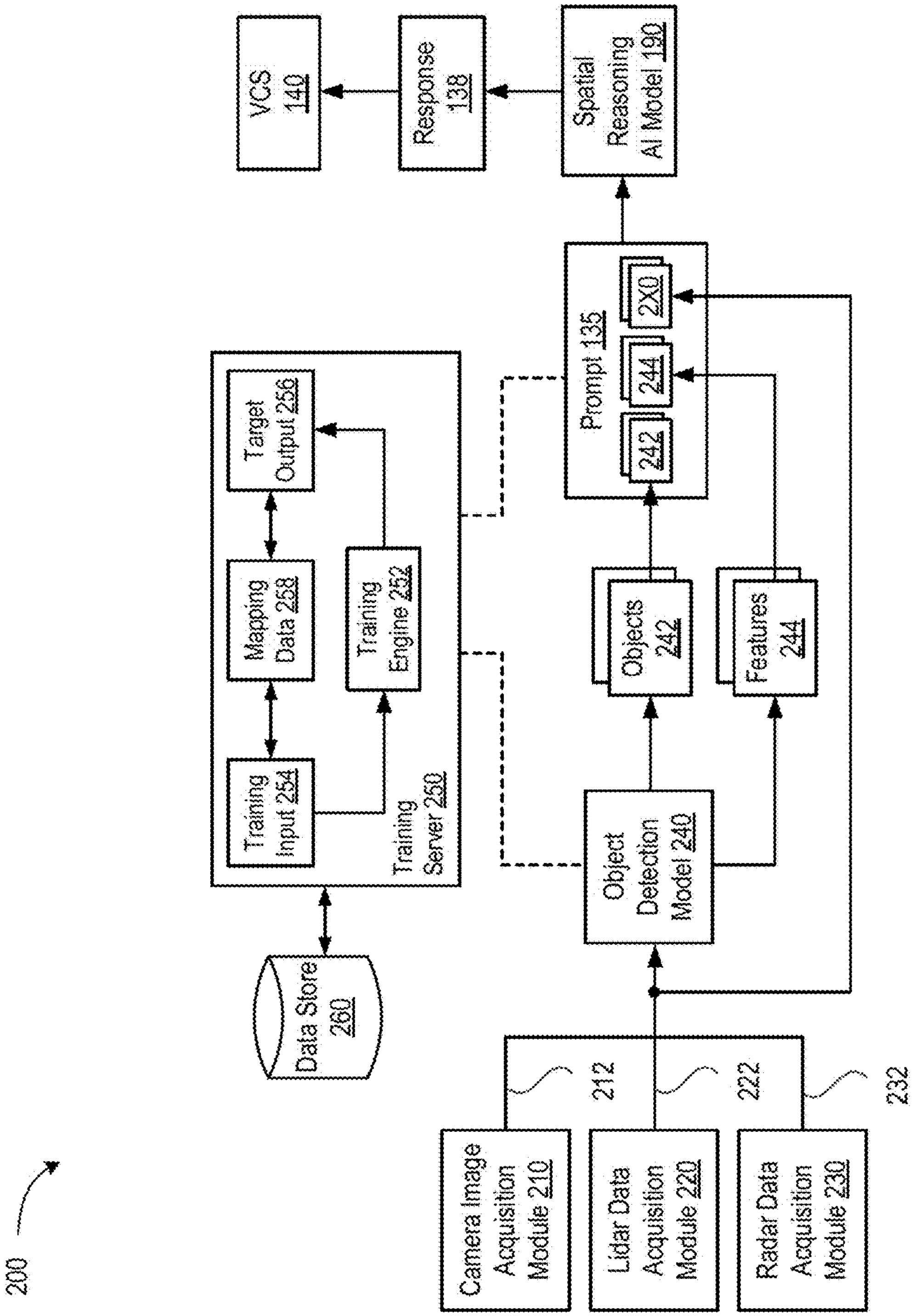
FIG. 2 is a diagram illustrating an example vehicle-server computing system capable of efficient evaluation of suitability of stopping locations using an AI model, in accordance with some implementations of the present disclosure.

FIG. 2 is a diagram illustrating an example vehicle-server computing system 200 capable of efficient evaluation of suitability of stopping locations using an AI model, in accordance with some implementations of the present disclosure. Vehicle-server computing system 200 can be implemented using various modules and components shown in FIG. 1, e.g., positional subsystem 122, roadgraph information 124, sensing system 110, perception and planning system 130, and/or the like.

An input into the vehicle-server computing system 200 can include various data obtained by sensors of the sensing system 110, e.g., lidar 112, radar 114, camera(s) 118, audio sensor(s) 116, infrared sensor(s) 119, and/or the like. In an example implementation, the data can be provided by a camera image acquisition module 210, a lidar data acquisition module 220, and/or radar data acquisition module 230. More specifically, camera image acquisition module 210 can acquire a sequence of camera images, e.g., two-dimensional projections of the driving environment (or a portion thereof) on an array of sensing detectors (e.g., charged coupled device or CCD detectors, complementary metal-oxide-semiconductor or CMOS detectors, and/or the like). Each camera image can have pixels of various intensities of one color (for black-and-white images) or multiple colors (for color images). The camera images can be panoramic images or images depicting a specific portion of the driving environment. The camera images can include a number of pixels. The number of pixels can depend on the resolution of the image. Each pixel can be characterized by one or more intensity values. A black-and-white pixel can be characterized by one intensity value, e.g., representing the brightness of the pixel, with value 1 corresponding to a white pixel and value 0 corresponding to a black pixel (or vice versa). The intensity value can assume continuous (or discretized) values between 0 and 1 (or between any other chosen limits, e.g., 0 and 255). Similarly, a color pixel can be represented by more than one intensity value, such as three intensity values (e.g., if the RGB color encoding scheme is used) or four intensity values (e.g., if the CMYK color encoding scheme is used). Camera images can be preprocessed, e.g., downscaled (with multiple pixel intensity values combined into a single pixel value), upsampled, filtered, denoised, and the like. Camera image(s) can be in any suitable digital format (JPEG, TIFF, GIG, BMP, CGM, SVG, and so on).

A lidar data acquisition module 220 (and, similarly, radar data acquisition module 230) can provide lidar (radar) images, which can include a set of return points (point cloud) corresponding to laser (radar) beam reflections from various objects in the driving environment. Each return point can be understood as a data unit (pixel) that includes coordinates of reflecting surfaces, radial velocity data, intensity data, and/or the like. For example, lidar data acquisition module 220 (radar data acquisition module 230) can provide the images that includes the intensity map $I(R, \theta, \phi)$, where $R, \theta, \phi$ is a set of spherical coordinates. In some implementations, Cartesian coordinates, elliptic coordinates, parabolic coordinates, or any other suitable coordinates can be used instead. The intensity map identifies an intensity of the lidar (radar) reflections for various points in the field of view. The coordinates of objects (or surfaces of the objects) that reflect lidar (radar) signals can be determined from directional data (e.g., polar $\theta$ and azimuthal $\phi$ angles in the direction of lidar transmissions) and distance data (e.g., radial distance R determined from the time of flight of lidar signals). The lidar and/or radar images can further include velocity data of various reflecting objects identified based on detected Doppler shift of the reflected signals. Although FIG. 2 illustrates an implementation in which three data acquisition modules are deployed, one or more data acquisition modules can be absent (or disabled) in other implementations. For example, the camera image acquisition module 210 and the lidar (or radar) data acquisition module 220 can be deployed while the radar data acquisition module 230 (or lidar data acquisition module 220) is not deployed. In some implementations, additional data acquisition modules not shown in FIG. 2 can be used (e.g., ultrasonic data acquisition module).

The camera images, lidar data, and/or radar data can depict or otherwise sense the entire driving environment or a substantial portion of the driving environment (e.g., camera image acquired by a forward-facing camera(s) of the vehicle's sensing system). The acquired camera, lidar, and/or radar images can be processed by an object detection model 240 that can include a model (or multiple models) trained to identify individual objects 242 in the driving environment. Object detection model 240 can be (or include) any suitable computer vision model, e.g., a machine learning model trained to identify regions that include objects of interest, e.g., vehicles, pedestrians, animals, and/or the like.

In some implementations, objects 242 identified by object detection model 240 can also be tracked across different frames, e.g., sets of data associated with different timestamp $t_j$. For example, object tracking can include identifying and updating geo-motion data, such as object's location (coordinates) $\vec{R}(t_j)$, velocity $\vec{V}(t_j)$, acceleration $\vec{\alpha}(t_j)$, angular velocity $\vec{\omega}(t_j)$, and/or the like. In some implementations, tracking of objects can be performed using a suitable statistical filter, e.g., Kalman filter. Kalman filter computes: (i) a most probable geo-motion data in view of the measurements (images) obtained, (ii) predictions made according to a physical model of object's motion, and (ii) statistical assumptions about measurement errors (e.g., covariance matrix of errors). Based on this collected data, object tracking can estimate, for a certain time horizon (e.g., one or several second), an accurate future motion of the object.

In some implementations, objects 242 can be identified by their bounding boxes, e.g., using coordinates of opposing rectangular two-dimensional or three-dimensional shapes or some equivalent form (e.g., coordinates of centroids of the boxes and their dimensions, e.g., width, height, depth). In some implementations, bounding shapes other than boxes can be used, e.g., convex hulls, polygons, etc., that enclose detected objects. In some implementations, objects 242 can further be identified by type (labels), e.g., "car," "light truck," "heavy truck," "motorcycle," "scooter," "pedestrian," "pedestrian in a wheelchair," "traffic light," "road sign," and/or the like.

In some implementations, the perception and planning system of the AV can generate prompt 135 for a spatial reasoning AI model 190. In some implementations, prompt 135 can be a natural language prompt requesting the spatial reasoning AI model 190 to assess the current location of the stopped AV 100. In one example illustrative implementation, prompt 135 can include:

Scenario:

You are in a car and can see the surrounding traffic through a stitched image combining information from multiple cameras mounted on your car (your car itself is not visible in the images). The stitched image has four rows. The first row is a view from the front of your car. The second row is a view from the left side of your car. The third row is a view from the back of your car. The fourth row is a view from the right side of your car.

Additional Information:

The stitched image size is 1280 pixels wide by 1280 pixels high. Descriptions of nearby objects in the scene, including their centroid coordinates (x, y) within the stitched image with (0, 0) being the top left corner.

1. Stationary car at (764, 1146);
2. Stationary car at (824, 838);
3. Stationary car at (500, 838);
4. Stationary car at (633, 1145);
5. Stationary car at (937, 1199).

Question:

Based on the above information, is your current pullover location blocking any cars? Reply "No" if there is no surrounding traffic or if the traffic can easily move around your car. Reply "Yes" if your car is blocking:

active traffic from behind;
perpendicular traffic to your side;
a car exiting a parallel parking spot;
a car entering or exiting a driveway, the car (marked with an oval);
any other active surrounding traffic.

Figure 3:
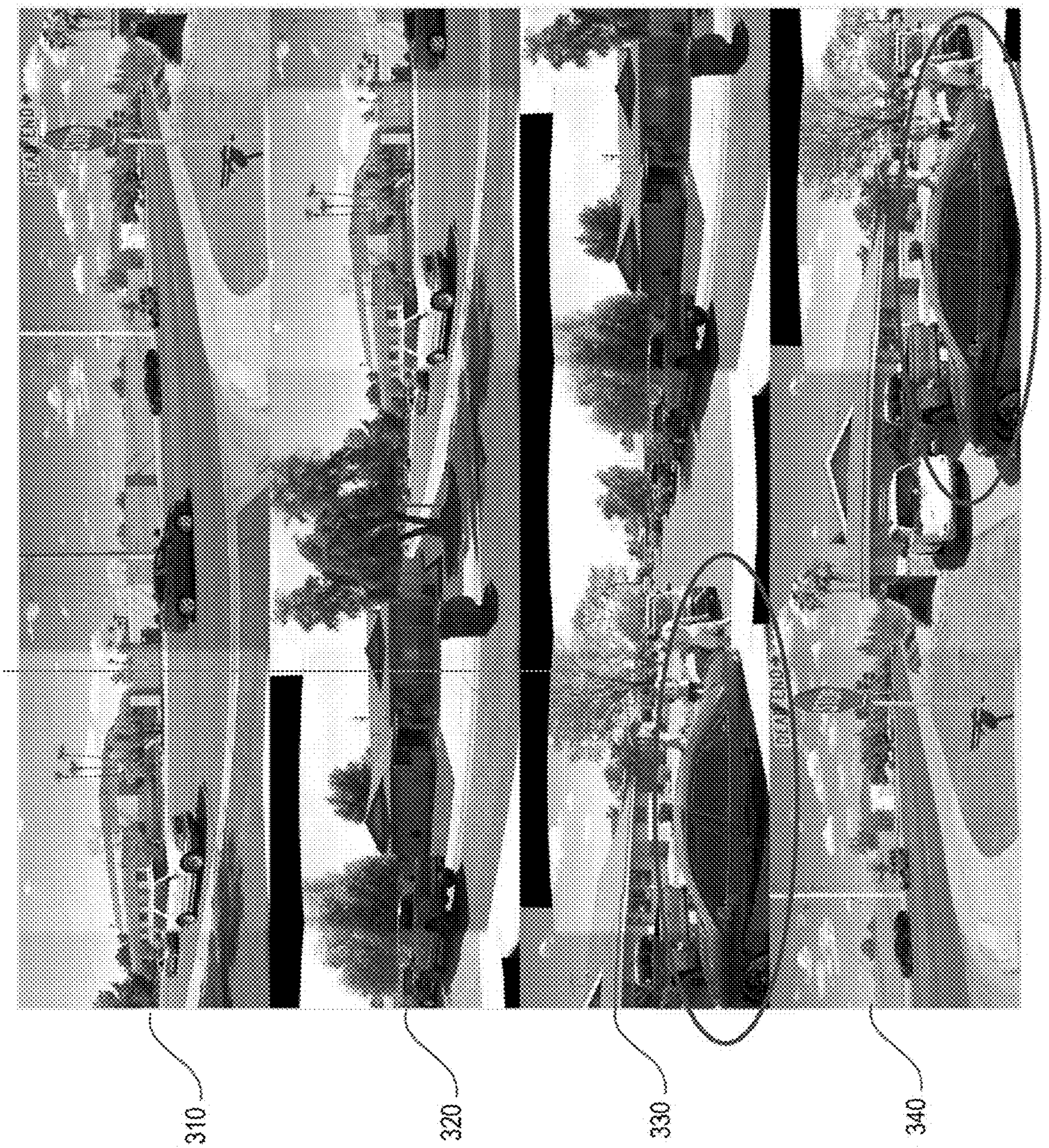
FIG. 3 is an example stitched image used as part of a context information provided with an example prompt to an AI model, in accordance with some implementations of the present disclosure.

FIG. 3 is an example stitched image 300 used as part of context information provided with example prompt 135 to an AI model, in accordance with some implementations of the present disclosure. As illustrated, stitched image 300 includes a first row 310 showing a view from the front of an AV, a second row 320 showing a view from the left side of the AV, a third row 330 showing a view from the back of the AV, and a fourth row 340 showing a view from the right side of the AV.

Referring again to FIG. 2, in the above example the prompt 135 included identifications of detected objects 242 and additional information that included camera images 212. Prompt 135 also included context information and a question directed to the AI model. In other implementations, prompt 135 can include (in addition to or instead of camera images 212) lidar data 222 (e.g., a portion of the lidar cloud associated with nearby objects), radar data 232, and/or the like. Other types of sensing data can also be used as inputs into the spatial reasoning AI model 190, e.g., microphone data, sonar (e.g., ultrasonic) data, roadgraph (map) data, and/or the like. Data of various kinds is denoted inclusively as 2X0 in FIG. 2.

In some implementations, prompt 135 can further include features 244, also known as feature vectors or embeddings. Features 244 should be understood as any intermediate output of the object detection model 240 (or an output of a trained embeddings model that converts various data 2X0 into a format suitable for inputting into object detection model 240) that constitutes a digital representation of appearances of objects 242 present in the driving environment. An individual feature 244 should be understood as any suitable digital representation of a respective object (or a set of multiple objects), e.g., as a vector (string) of any number M of components, which can have integer values or floating-point values. Features 244 can be considered as vectors or points in an M-dimensional embedding space. The dimensionality M of the feature space (defined as part of architecture of the object detection model 240) can be smaller than the size of the data 2X0. During training, object detection model 240 (or an embedding model) learns to associate images of similar objects with similar features represented by points closely situated in the feature space and further learns to associate images of dissimilar objects with points that are located further apart in that space.

Generally, spatial reasoning AI model 190 can take any data that the model has been trained to process and from which the model learned how to extract useful information relevant for assessing suitability of stopping locations for hosting a vehicle.

Spatial reasoning AI model 190 can include any suitable model trained to perform logical reasoning based on visual data or other suitable data representative of spatial arrangement of objects. Spatial reasoning AI model 190 can include a language model (LM), e.g., a large language model (LLM), vision language model (VLM), multi-modal language model (MMLM), and/or the like, or some combination thereof. For example, spatial reasoning AI model 190 can include an LLM trained to acquire general language proficiency, e.g., to understand general structure of a natural language, support conversations in the natural language, perform logical reasoning in the natural language, explain such reasoning, and/or perform other suitable tasks. LLMs can undergo self-supervised training on large amounts of texts while learning to predict the next and/or missing word in a phrase/sentence, detect intent and/or sentiment of a speaker, determine whether given sentences are related or unrelated, and/or the like. Following initial self-supervised training, an LLM often undergoes additional instructional (prompt-based) supervised training (fine-tuning), which causes LLMs to acquire more in-depth language proficiency and/or master more specialized tasks.

In some implementations, e.g., where spatial reasoning AI model 190 includes a VLM (or MMLM), the model can be trained to process multiple modalities of inputs, e.g., text prompts and images and/or videos. VLMs combine visual perception with the ability to understand text, including identifying objects that are described in the text or, conversely, describing objects perceived in images/video using natural language (e.g., performing image captioning), and/or the like. In some implementations, spatial reasoning AI model 190 includes an open vocabulary model that is trained to leverage learned text understanding to perform object recognition.

Spatial reasoning AI model 190 can process prompt 135 and various additional data (e.g., objects 242, features 244, raw data 2X0, and/or the like) and generate response 138 indicative of whether the AV 100 is obstructing traffic at its current location or likely to be obstructing traffic within a certain time horizon, e.g., 10 seconds, 20 seconds, 30 seconds, and so on. In those instances where the determination of obstruction is made, the planner system of the AV can output instructions to the vehicle control system 140 to move the AV from the current location.

Object detection model 240 and/or spatial reasoning AI model 190 can be trained using actual camera images, lidar data, radar data, and/or other data depicting objects present in various driving environments, e.g., urban driving environments, but may also include objects in highway driving environments, rural driving environments, off-road driving environments, and/or the like. Training can be performed by a training engine 252 hosted by a training server 250, which can be an external server that deploys one or more processing devices, such as central processing units (CPUs), graphics processing units (GPUs), tensor processing units (TPUs), and/or the like. In some implementations, object detection model 240 and/or spatial reasoning AI model 190 can be trained by training engine 252 and subsequently downloaded onto the perception system of the AV and/or fleet server. Object detection model 240 and/or spatial reasoning AI model 190, as illustrated in FIG. 2, can be trained using training data that includes training inputs 254 and corresponding target outputs 256 (correct matches for the respective training inputs 254). During training of object detection model 240 and/or spatial reasoning AI model 190, training engine 252 can find patterns in the training data that map training inputs 254 to the target outputs 256.

Training engine 252 can have access to a data store 260 storing multiple camera images, sets of lidar data, and/or radar data collected during actual driving missions in a variety of environments. Training inputs 254 can be annotated with labels or some other suitable mapping data 258 (ground truth annotations), that map training inputs 254 to the corresponding target outputs 256, e.g., including but not limited to correct identification of whether a vehicle (or multiple vehicles) in training inputs 254 are obstructing other vehicles, and/or other similar information. In some implementations, annotations can be made using human inputs. Stored training inputs 254 can include large datasets (e.g., with hundreds or thousands of images or more) that include camera images, lidar data, radar data, and/or the like. In some implementations, ground truth annotations can be made by a developer before the annotated training inputs are stored in the data store 260. During training, training server 250 can retrieve annotated training data from the data store 260, including one or more training inputs 254 and one or more target outputs 256 mapped by mapping data 258.

During training of object detection model 240 and/or spatial reasoning AI model 190, training engine 252 can change parameters (e.g., weights and biases) of object detection model 240 and/or spatial reasoning AI model 190 until the model(s) successfully learn how to predict correct target outputs 256. In some implementations, object detection model 240 and/or spatial reasoning AI model 190 can be trained separately. In various implementations, more than one spatial reasoning AI model 190 can be trained for use under different conditions and for different driving environments, e.g., separate spatial reasoning AI models 190 can be trained for highway driving environments and urban driving environments. Different spatial reasoning AI models 190 can have different architectures (e.g., different numbers of neuron layers and different topologies of neural connections), different settings (e.g., activation functions, etc.), and can be trained using different sets of hyperparameters.

Data store 260 can be a persistent storage capable of storing lidar data, camera images, as well as data structures configured to facilitate accurate and fast identification and validation of sign detections, in accordance with various implementations of the present disclosure. Data store 260 can be hosted by one or more storage devices, such as main memory, magnetic or optical storage disks, tapes, or hard drives, network-attached storage (NAS), storage area network (SAN), and so forth. Although depicted as separate from training server 250, in some implementations, data store 260 can be a part of training server 250. In some implementations, data store 260 can be a network-attached file server, while in other implementations, data store 260 can be some other type of persistent storage such as an object-oriented database, a relational database, and so forth, that can be hosted by a server machine or one or more different machines accessible to the training server 250 via a network (not shown in FIG. 2).

Figure 4:
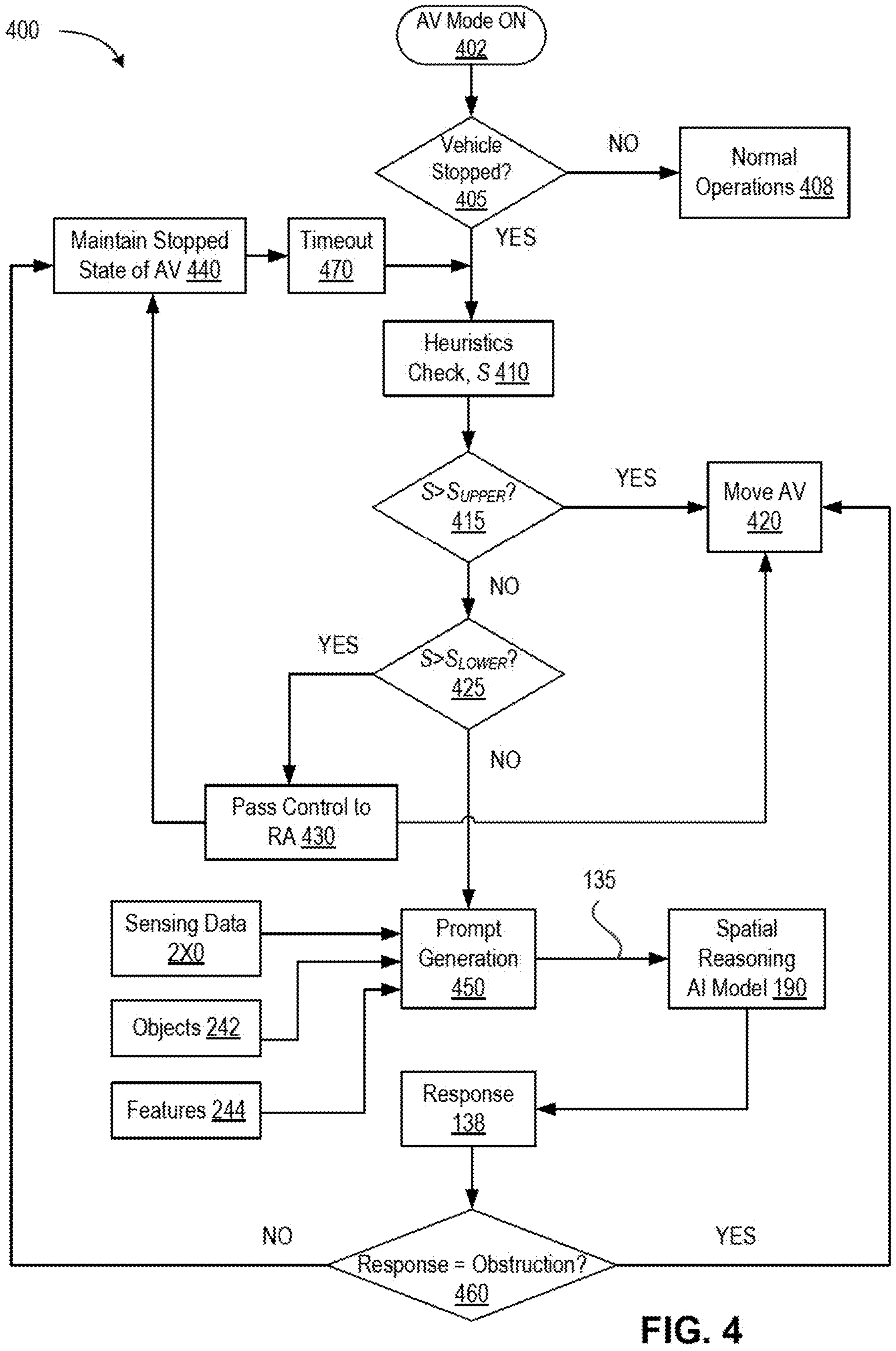
FIG. 4 is a flowchart illustrating example evaluation of stopping locations using a spatial reasoning AI model, in accordance with some implementations of the present disclosure.
Figure 5A:
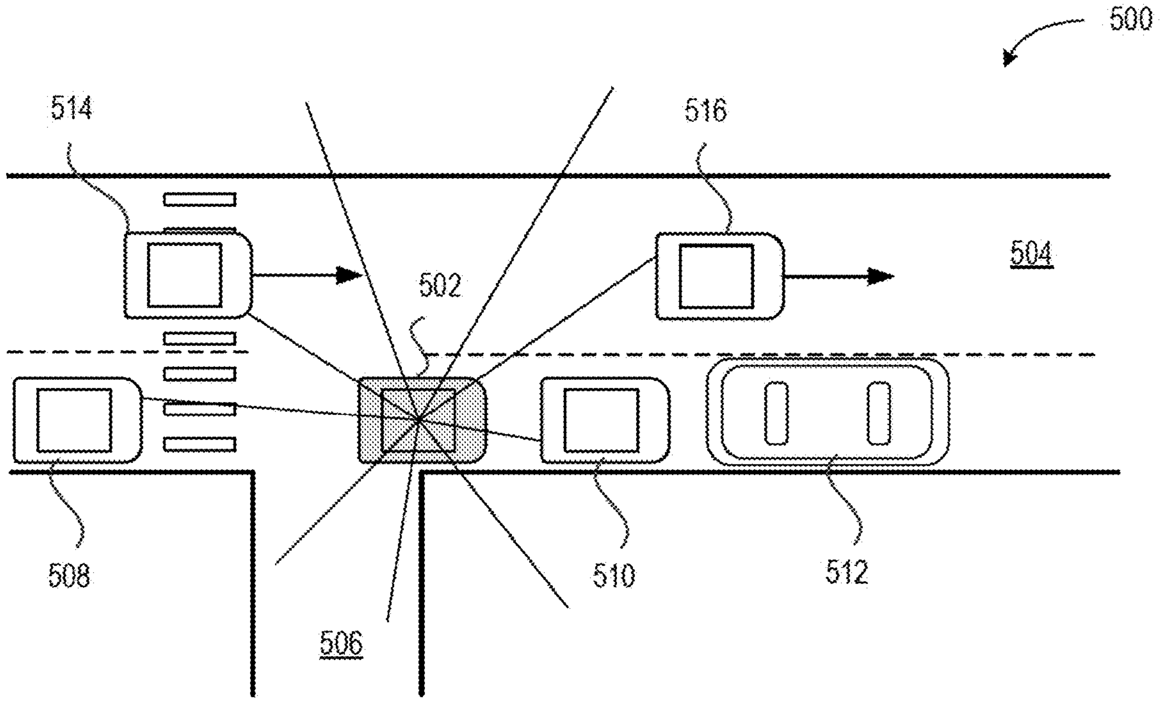
FIGS. 5A-5B depict schematically an example driving environment encountered by a stopped vehicle, in accordance with some implementations of the present disclosure.
Figure 5B:
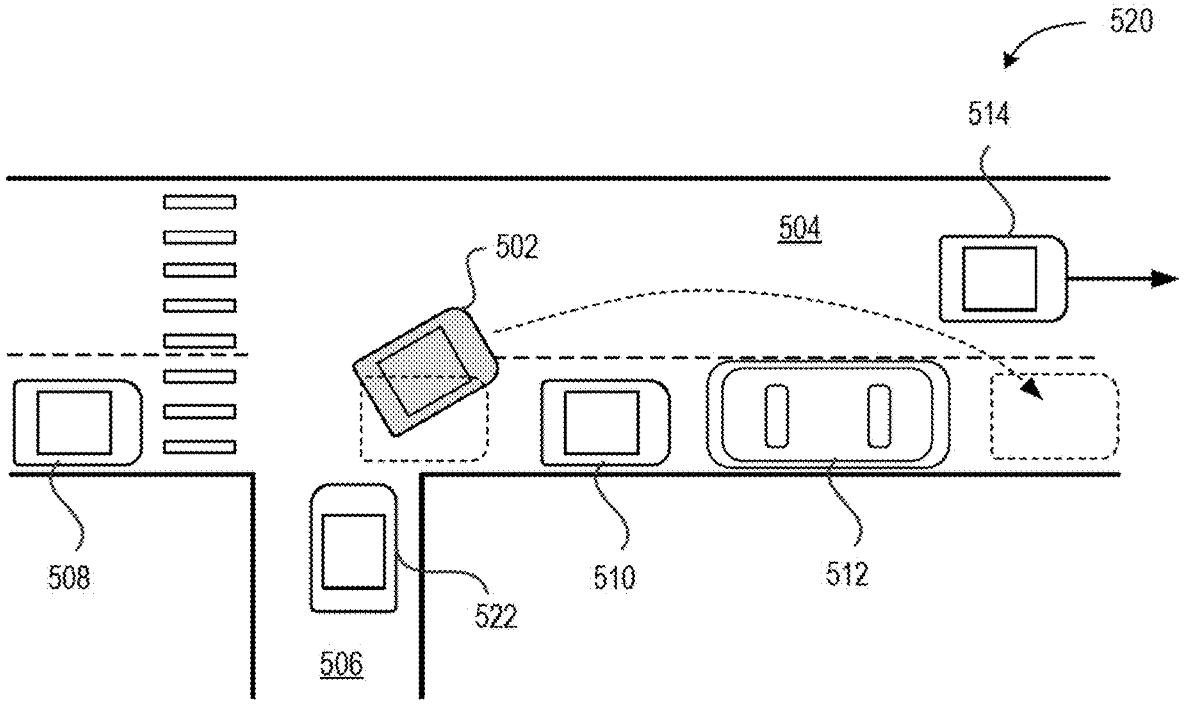

FIG. 4 is a flowchart 400 illustrating example evaluation of stopping locations using a spatial reasoning AI model, in accordance with some implementations of the present disclosure. Example evaluation of FIG. 4 will be further illustrated with reference to FIGS. 5A-5B, depicting schematically an example driving environment encountered by a stopped vehicle, in accordance with some implementations of the present disclosure. FIG. 5A illustrates a driving environment 500 of the driving scene at a first time and depicts a vehicle 502 stopped on a one-way street 504 near a driveway 506. Because of parked cars 508 and 510 and a bus 512, the vehicle 502 may have no other immediate choice but to stop at a location near the driveway 506. The vehicle 502 can collect sensing data (as depicted schematically with rays intersecting on the vehicle 502) of various modalities (e.g., camera, lidar, radar, sonar, and/or the like) and detect presence of parked cars 508 and 508, moving cars 514 and 516, and/or various other objects (e.g., buildings, trees, structures, pedestrians, and/or the like) not shown in FIG. 5A for conciseness and ease of viewing.

The vehicle 502 can be operating in an autonomous mode or a driver assistance mode, as illustrated with block 402 of FIG. 4. Operations illustrated in FIG. 4 can be performed by one or more processing devices used by perception and planning system 130 (with reference to FIG. 1) of the vehicle 502. At block 405, the processing device(s) performing operations illustrated in FIG. 4 can determine whether the autonomous vehicle has stopped. In those situation where the autonomous vehicle is still moving, the perception and planning system can perform normal operations 408, which can include identifying a target destination, charting a driving path to the target destination, monitoring driving environment using collected sensing data, identifying and tracking objects in the driving environment, avoiding the identified objects and moving according to traffic lights, road signs, and any applicable traffic laws and regulations. In those instances where the autonomous vehicle has stopped, the processing devices can perform a heuristics check 410, which include an initial (preliminary) classification of the current stopping location of the autonomous vehicle and a state of the driving environment in the vicinity of that stopping location.

In some implementations, the heuristics check 410 can include presence or absence of another vehicle (which can be moving or stopped) whose driving path likely intersects with the AV, distance to the opposite edge of the street, median, lane boundaries, presence or absence of driveways, pedestrian crossings, proximity to traffic lights, road signs, and/or the like. In some implementations, various heuristics can be combined into a list of positive or negative determinations to be made, each of the determinations given a certain predetermined (empirically set) score for a respective positive and/or negative determination. For example, one of the determinations can include "presence of a car within distance d from the autonomous vehicle" with a certain score given to positive determinations and zero score given to negative determinations. Similarly, a determination of "the car's side is facing the autonomous vehicle" can be given a first score, "the car's back is facing the autonomous vehicle" can be given a second (higher) score, "the car's front is facing the autonomous vehicle" can be given a third (yet higher) score, and/or the like. Various heuristic scores can be added (or otherwise aggregated) into a total score S indicative of how likely the current state of the driving environment makes the current location unsuitable for the vehicle. The score S can be used to determine whether the vehicle is to leave its current location immediately or if the driving situation allows for performance of additional checks.

In one non-limiting example, at decision-making block 415, the heuristics score S can be compared to an empirically set upper threshold $S_{UPPER}$. In those instances, where $S>S_{UPPER}$ (or $S>S_{UPPER}$), the likelihood that the autonomous vehicle is obstructing traffic can be deemed high, and the vehicle control system can be instructed to move the vehicle (block 420). In those instances where $S\leq S_{UPPER}$ (or $S<S_{UPPER}$), another check can be performed to determine whether the heuristics score S is above a lower threshold SLOWER. In those instances, where it is determined, at block 425, that S>SLOWER (or S>SLOWER), the likelihood that the autonomous vehicle is obstructing traffic can be deemed medium with the control passed, at block 430, to a remote assistant, e.g., a human controller and/or dispatcher, who can determine whether the autonomous vehicle is to be moved (in which case the flow of operations passes to block 420) or to remain stationary at the current location (block 440). In the latter instances, the heuristics check 410 can be repeated after a predetermined timeout 470, e.g., 5 seconds, 10 seconds, 20 seconds, and/or the like.

In those instances where S≤SLOWER (or S<SLOWER), the operations can continue with a prompt generation 450, which can be performed, e.g., as disclosed in conjunction with FIG. 2 and FIG. 3, or in a similar fashion. Prompt generation 450 can involve using various sensing data 2X0, objects 242 (e.g., output by object detection model 240, with reference to with FIG. 2), features 244 (e.g., any suitable intermediate outputs of the object detection model 240), and/or any additional data. Prompt 135 generated by prompt generation 450 may be communicated (e.g., via a suitable radio communication channel) to a spatial reasoning AI model 190, which can be located on a fleet server 180 (with reference to with FIG. 1), or some other suitable AI model. In some implementations, e.g., if computing resources of the vehicle permit, the spatial reasoning AI model 190 can be hosted by the vehicle and executed using the vehicles' processing and memory resources. Spatial reasoning AI model 190 can process prompt 135 and various additional data and output response 138 predicting whether the AV at its current location is obstructing (or likely to obstruct traffic in the immediate future).

In those instances where, at block 460, response 138 indicates that the autonomous vehicle is not obstructing traffic (or unlikely to obstruct traffic soon), the autonomous vehicle can be maintained in the stopped state at the current location (block 440) and the full cycle can be repeated after timeout 470. In those instances where, at block 460, response 138 indicates that the autonomous vehicle is obstructing traffic (or likely to obstruct traffic soon), the vehicle control system can be instructed to move the vehicle (block 420). FIG. 5B illustrates a driving environment 520 at a second time that is later than the first time corresponding to the driving environment 500 of FIG. 5A. Responsive to determining (e.g., using the heuristics check 410 or response 138 generated by spatial reasoning AI model 190, as disclosed above) that the vehicle 502 is obstructing vehicle 522, operations illustrated in FIG. 4 can include moving vehicle 502 to a different location, e.g., as illustrated with the dashed arrow.

Figure 6:
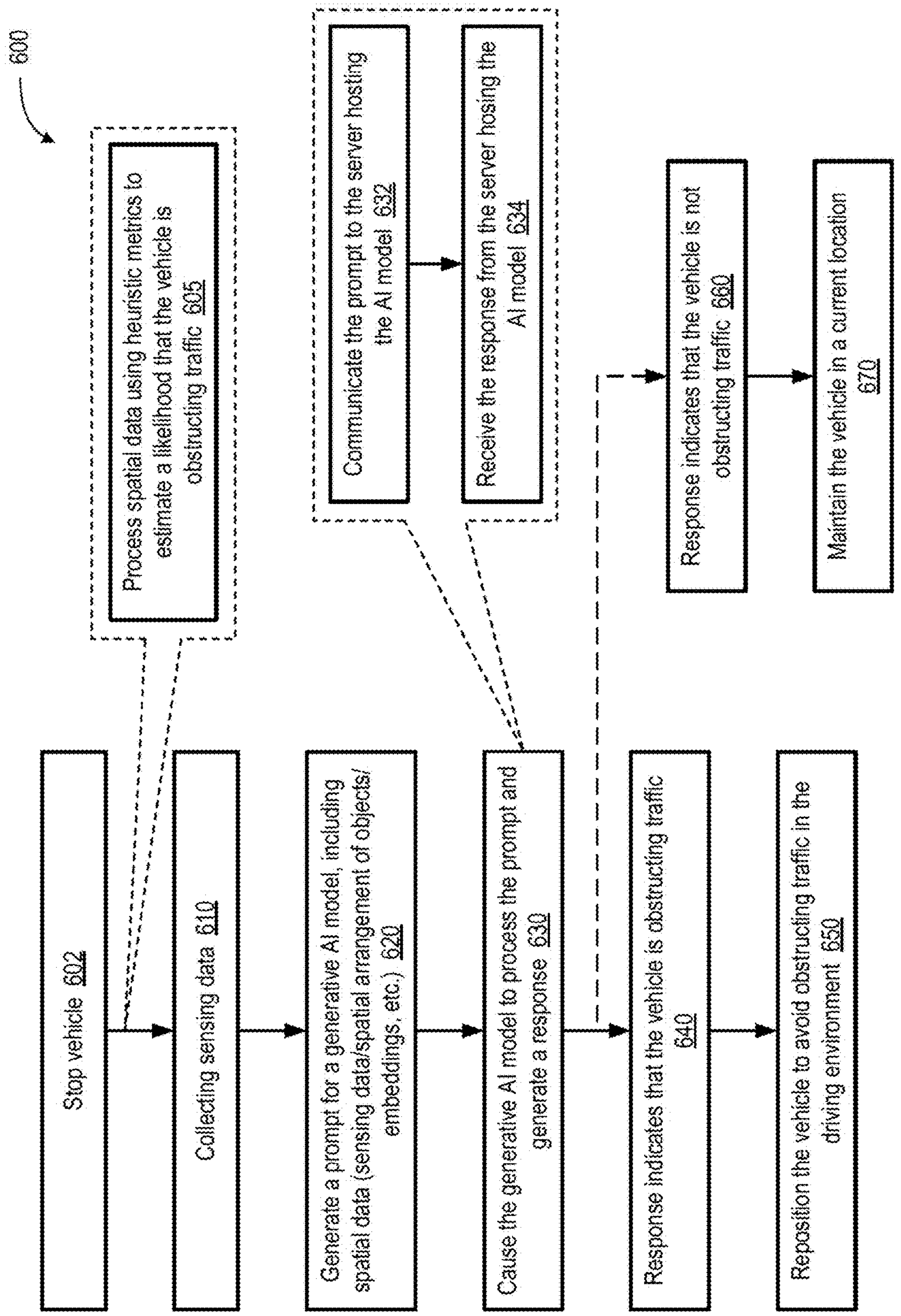
FIG. 6 illustrates an example method of evaluating suitability of stopping locations of a vehicle using a generative AI model, in accordance with some implementations of the present disclosure.

FIG. 6 illustrates an example method 600 of evaluating suitability of stopping locations of a vehicle using a generative AI model, in accordance with some implementations of the present disclosure. A processing device, having one or more processing units (CPUs), one or more graphics processing units (GPUs), one or more parallel processing units (PPUs) and memory devices communicatively coupled to the CPU(s), GPU(s), and/or PPU(s) can perform method 600 and/or each of its individual functions, routines, subroutines, or operations. Method 600 can be directed to systems and components of a vehicle. In some implementations, the vehicle can be an autonomous vehicle. In some implementations, the vehicle can be a driver-operated vehicle equipped with driver-assistance systems, e.g., Level 2 or Level 3 driver assistance systems, that provide limited assistance with specific vehicle functions (e.g., steering, braking, acceleration, etc. systems) or under limited driving conditions (e.g., highway driving). Method 600 can be executed by a suitable processing device or multiple processing devices. In one example, operations of method 600 can be, at least partially, performed using system memory 126 and processor 128 of autonomous vehicle 100, in some implementations. In certain implementations, a single processing thread can perform method 600. Alternatively, two or more processing threads can perform method 600, each thread executing one or more individual functions, routines, subroutines, or operations of the method. In an illustrative example, the processing threads implementing method 600 can be synchronized (e.g., using semaphores, critical sections, and/or other thread synchronization mechanisms). Alternatively, the processing threads implementing method 600 can be executed asynchronously with respect to each other. Some operations of method 600 can be performed in a different order compared with the order shown in FIG. 6. Some operations of method 600 can be performed concurrently with other operations. Some operations can be optional.

In some implementations, at block 602, method 600 includes stopping a vehicle. At block 610, method 600 can include collecting, using a sensing system of a vehicle (e.g., sensing system 110 in FIG. 1), sensing data for a driving environment of the vehicle. The sensing data can include one or more camera images of the driving environment, lidar data for the driving environment, radar data, and/or sensing data of other modalities. In some implementations, the one or more camera images of the sensing data can jointly depict a 360-degree view of the driving environment. In some implementations, the sensing data can correspond to a sensing frame (e.g., a single timestamp). In some implementations, the sensing data can correspond to multiple sensing frames (e.g., multiple timestamps), e.g., include a several second-long video of the driving environment.

At block 620, method 600 can include generating a prompt (e.g., prompt 135 in FIG. 2 and FIG. 4) for a generative artificial intelligence (AI) model (e.g., spatial reasoning AI model 190 in FIG. 2 and FIG. 4). In some implementations, generating the prompt for the generative AI model may be responsive to receiving an earlier previous determination (e.g., 30 second ago, 1 minute ago, and/or the like), from an assistant (e.g., a remote human agent, a dispatcher, etc), that the autonomous vehicle can remain at the current location. Operations of method 600 may then be performed to reevaluate the driving environment at a later time to ensure that the vehicle is still not blocking traffic some time later. In some implementations, the prompt is generated responsive to determining (e.g., using one or more heuristics) that the likelihood of the autonomous vehicle blocking traffic is less than a threshold likelihood for requesting help from the assistant).

The prompt can include spatial data characterizing the driving environment. In some implementations, the spatial data can include the sensing data, e.g., raw or processed (e.g., filtered, cropped, denoised, and/or the like), data collected by the sensing system. In some implementations, the spatial data can include spatial arrangement of one or more objects (e.g., objects 242 in FIG. 2) in the driving environment identified based on the sensing data (e.g., as illustrated with the example prompt illustrated in conjunction with FIGS. 2 and 3). The prompt can include a request to determine, using the spatial data, whether the vehicle is obstructing traffic in the driving environment. In some implementations, the request can further include a roadgraph information for the driving environment of the autonomous vehicle (e.g., map information for the region where the vehicle is located). In some implementations, the request to determine whether the vehicle is obstructing traffic in the driving environment can include a natural language text. In some implementations, the spatial arrangement of the one or more objects can further include a localization of each of the one or more objects within the driving environment, a heading direction of each of the one or more objects, a type of each of the one or more objects, and/or other suitable information. In some implementations, the generative AI model can include a vision language model (VLM), a multi-modal language model (MMLM), and/or other model capable of visual and/or spatial reasoning.

In some implementations, the generative AI model can be trained using training data that includes a plurality of training prompts. Each training prompt can be associated with a respective driving situation of a plurality of driving situations and include spatial data characterizing the respective driving situation and a ground truth determination whether a vehicle in the respective driving situation is blocking traffic.

At block 630, method 600 can include causing the generative AI model to process the prompt and generate a response. In some implementations, the generative AI model can be hosted by a server external to the vehicle. In such implementations, causing the generative AI model to process the prompt and generate the response can include operations illustrated with the bottom callout portion of FIG. 6. More specifically, at block 632, operations of method 600 can include communicating the prompt to the server hosting the AI model (e.g., fleet server 180 in FIG. 1). At block 634, operations of method 600 can include receiving the response from the server hosing the AI model.

In those instances, where the generated response indicates (block 640) that the vehicle is obstructing traffic, method 600 can continue, at block 650, with causing, based on the generated response, a control system of the vehicle (e.g., VCS 140 in FIG. 1 and FIG. 2) to reposition the vehicle to avoid obstructing traffic in the driving environment. In those instances, where the generated response indicates (block 660) that the vehicle avoids obstructing traffic, method 600 can include, at block 670, causing, based on the generated response, the control system of the vehicle to maintain the vehicle at a current location.

In some implementations, operations of blocks 640-670 can be performed in relation to the same location of the vehicle. For example, initial sensing data, e.g., collected at time t', can be used to generate an initial prompt for the AI model that includes initial spatial data. The initial spatial data can include the initial sensing data or initial spatial arrangement, identified based on the initial sensing data, of one or more objects present in the driving environment at time t'. The initial sensing data can further include an initial request to the AI model to determine, using the initial spatial data, whether the vehicle is obstructing traffic in the driving environment at time t'. An initial response can then be received, e.g., as described above in conjunction with blocks 630, 660, and 670, indicating that the vehicle is not obstructing traffic in the driving environment at time t' and, based on this initial response, the control system of the vehicle can maintain the vehicle at the current location. At a later time t>t', when the conditions of the driving environment change (e.g., one or more new vehicles appear), repeating operations of blocks 610-640 can result in different determination that the vehicle is now obstructing traffic, and the vehicle can be moved to a new location (e.g., as illustrated in FIG. 5.)

In some implementations, e.g., as illustrated with the top callout block 605, prior to the processing that uses the AI model, the spatial data can be processed using one or more heuristic metrics (e.g., as described in conjunction with blocks 410-430 of FIG. 4) to obtain a quick estimate a likelihood that the vehicle is obstructing traffic in the driving environment. In such implementations, generating the prompt for the generative AI model can be responsive to the estimated likelihood (e.g., obstruction score S) being below a threshold value (e.g., threshold SLOWER, as described in conjunction with decision-making block 425 in FIG. 4).

Figure 7:
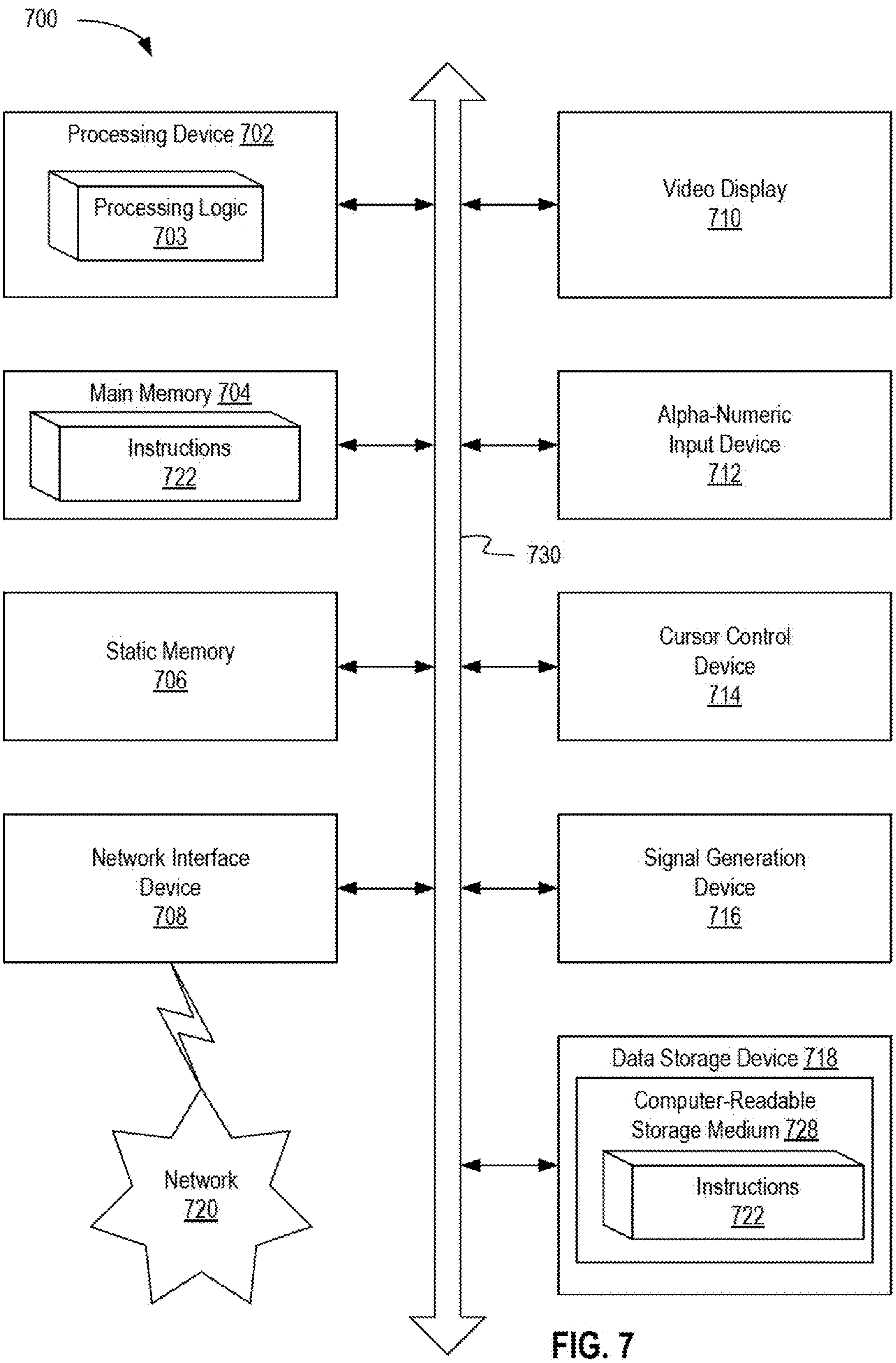
FIG. 7 depicts a block diagram of an example computer device capable of evaluating suitability of stopping locations of a vehicle using a generative AI model, in accordance with some implementations of the present disclosure.

FIG. 7 depicts a block diagram of an example computer device 700 capable of evaluating suitability of stopping locations of a vehicle using a generative AI model, in accordance with some implementations of the present disclosure. Example computer device 700 can be connected to other computer devices in a LAN, an intranet, an extranet, and/or the Internet. Example computer device 700 can operate in the capacity of a server in a client-server network environment. Example computer device 700 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 700 can include a processing device 702 (also referred to as a processor or CPU), a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a secondary memory (e.g., a data storage device 718), which can communicate with each other via a bus 730. In some implementations, processing device 702 may be or include processor 128 of FIG. 1 and main memory 704 can be or include system memory 126 in FIG. 1.

Processing device 702 (which can include processing logic 703) represents one or more general-purpose processing devices such as a microprocessor, central processing unit, or the like. More particularly, processing device 702 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. In accordance with one or more aspects of the present disclosure, processing device 702 can be configured to execute instructions performing method 600 of evaluating suitability of stopping locations of a vehicle using a generative AI model.

Example computer device 700 can further include a network interface device 708, which can be communicatively coupled to a network 720. Example computer device 700 can further comprise a video display 710 (e.g., a liquid crystal display (LCD), a touch screen, or a cathode ray tube (CRT)), an alphanumeric input device 712 (e.g., a keyboard), a cursor control device 714 (e.g., a mouse), and an acoustic signal generation device 716 (e.g., a speaker).

Data storage device 718 can include a computer-readable storage medium (or, more specifically, a non-transitory computer-readable storage medium) 728 on which is stored one or more sets of executable instructions 722. In accordance with one or more aspects of the present disclosure, executable instructions 722 can comprise executable instructions performing method 600 of evaluating suitability of stopping locations of a vehicle using a generative AI model.

Executable instructions 722 can also reside, completely or at least partially, within main memory 704 and/or within processing device 702 during execution thereof by example computer device 700, main memory 704 and processing device 702 also constituting computer-readable storage media. Executable instructions 722 can further be transmitted or received over a network via network interface device 708.

While the computer-readable storage medium 728 is shown in FIG. 7 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. An autonomous vehicle comprising:

a sensing system to collect sensing data for a driving environment of the autonomous vehicle;

a data processing system to:

generate a prompt for a generative artificial intelligence (AI) model, the prompt comprising:

spatial data characterizing the driving environment, wherein the spatial data comprises at least one of: (i) the sensing data, or (ii) spatial arrangement of one or more objects in the driving environment identified based on the sensing data, and a request to determine, using the spatial data, whether the autonomous vehicle is obstructing traffic in the driving environment;

cause the generative AI model to process the prompt and generate a response indicating that the autonomous vehicle is obstructing traffic in the driving environment; and an autonomous vehicle control system to:

reposition, responsive to the generated response, the autonomous vehicle to avoid obstructing traffic in the driving environment.

2. The autonomous vehicle of claim 1, wherein the autonomous vehicle is stationary.

3. The autonomous vehicle of claim 1, wherein the sensing data comprises at least one of:

one or more camera images of the driving environment, lidar data for the driving environment, or radar data for the driving environment.

4. The autonomous vehicle of claim 3, wherein the sensing data comprises the one or more camera images jointly depicting a 360-degree view of the driving environment.

5. The autonomous vehicle of claim 1, wherein the spatial data further comprises:

a roadgraph information for the driving environment of the autonomous vehicle.

6. The autonomous vehicle of claim 1, wherein the request to determine whether the vehicle is obstructing traffic in the driving environment comprises a natural language text.

7. The autonomous vehicle of claim 1, wherein the spatial arrangement of the one or more objects comprises at least one of:

a localization of each of the one or more objects within the driving environment, or a type of each of the one or more objects.

8. The autonomous vehicle of claim 1, wherein the generative AI model is hosted by a server external to the autonomous vehicle, and wherein causing the generative AI model to process the prompt and generate the response comprises:

communicating the prompt to the server hosting the AI model; and receiving the response from the server hosing the AI model.

9. The autonomous vehicle of claim 1, wherein the generative AI model comprises at least one of:

a vision language model (VLM), or a multi-modal language model (MMLM).

10. The autonomous vehicle of claim 1, wherein the data processing system is further to:

process, using one or more heuristic metrics, the spatial data to estimate a likelihood that the vehicle is obstructing traffic in the driving environment, wherein the prompt for the generative AI model is generated in response to the estimated likelihood being below a threshold value.

11. The autonomous vehicle of claim 1, wherein the sensing data is collected at a first time, wherein the sensing system is further to:

collect initial sensing data for the driving environment of the autonomous vehicle at a second time that is earlier than the first time;

generate an initial prompt for the AI model, the initial prompt comprising:

initial spatial data characterizing the driving environment at the second time, wherein the initial spatial data comprises at least one of: (i) the initial sensing data, or (ii) initial spatial arrangement, identified based on the initial sensing data, of one or more objects present in the driving environment at the second time, and an initial request to determine, using the initial spatial data, whether the autonomous vehicle is obstructing traffic in the driving environment at the second time; and wherein the data processing system is further to:

cause the generative AI model to process the initial prompt and generate an initial response indicating that the vehicle avoids obstructing traffic in the driving environment at the second time; and cause, responsive to the initial response, the autonomous vehicle control system to maintain the autonomous vehicle at a current location.

12. The autonomous vehicle of claim 1, wherein the generative AI model is trained using training data comprising:

a plurality of training prompts, each training prompt associated with a respective driving situation of a plurality of driving situations and comprising:

spatial data characterizing the respective driving situation, and a ground truth determination whether a vehicle in the respective driving situation is blocking traffic.

13. The autonomous vehicle of claim 1, wherein the data processing system generates the prompt for the generative AI model responsive to one or more:

an earlier determination, received from an outside assistant, that the autonomous vehicle is to remain at the current location, or a heuristic-based determination that a likelihood of the autonomous vehicle blocking traffic is less than a threshold likelihood.

14. A system comprising:

a sensing system of a vehicle, to:

collect sensing data for a driving environment of the vehicle;

a data processing system of the vehicle, to:

generate a prompt for a generative artificial intelligence (AI) model, the prompt comprising:

spatial data characterizing the driving environment, wherein the spatial data comprises at least one of: (i) the sensing data, or (ii) spatial arrangement of one or more objects in the driving environment identified based on the sensing data, and a request to determine, using the spatial data, whether the vehicle is obstructing traffic in the driving environment;

a computing device external to the vehicle, to:

apply the generative AI model to the prompt to generate an AI model response indicating that the vehicle is obstructing traffic in the driving environment; and communicate the AI model response to the vehicle; and a control system of the vehicle:

cause, responsive to the AI response, to reposition the vehicle to avoid obstructing traffic in the driving environment.

15. A method comprising:

collecting, using a sensing system of a vehicle, sensing data for a driving environment of the vehicle;

generating a prompt for a generative artificial intelligence (AI) model, the prompt comprising:

spatial data characterizing the driving environment, wherein the spatial data comprises at least one of: (i) the sensing data, or (ii) spatial arrangement of one or more objects in the driving environment identified based on the sensing data, and a request to determine, using the spatial data, whether the vehicle is obstructing traffic in the driving environment;

causing the generative AI model to process the prompt and generate a response indicating that the vehicle is obstructing traffic in the driving environment; and causing, responsive to the generated response, a control system of the vehicle to reposition the vehicle to avoid obstructing traffic in the driving environment.

16. The method of claim 15, wherein the sensing data comprises one or more camera images jointly depicting a 360-degree view of the driving environment.

17. The method of claim 15, wherein the request to determine whether the vehicle is obstructing traffic in the driving environment comprises a natural language text.

18. The method of claim 15, wherein the spatial arrangement of the one or more objects comprises at least one of:
- a localization of each of the one or more objects within the driving environment, or
- a type of each of the one or more objects.

19. The method of claim 15, wherein the generative AI model comprises at least one of:
- a vision language model (VLM), or
- a multi-modal language model (MMLM).

20. The method of claim 15, wherein the sensing data is collected at a first time, the method further comprising:
- collecting, using the sensing system of a vehicle, initial sensing data for the driving environment of the vehicle at a second time that is earlier than the first time;
- generating an initial prompt for the AI model, the initial prompt comprising:
  - initial spatial data characterizing the driving environment at the second time, wherein the initial spatial data comprises at least one of: (i) the initial sensing data, or (ii) initial spatial arrangement, identified based on the initial sensing data, of one or more objects present in the driving environment at the second time, and
  - an initial request to determine, using the initial spatial data, whether the vehicle is obstructing traffic in the driving environment at the second time;
- causing the generative AI model to process the initial prompt and generate an initial response indicating that the vehicle avoids obstructing traffic in the driving environment at the second time; and
- causing, responsive to the initial response, the control system of the vehicle to maintain the vehicle at a current location.

21. The method of claim 15, wherein the generative AI model is trained using training data comprising:
- a plurality of training prompts, each training prompt associated with a respective driving situation of a plurality of driving situations and comprising:
  - spatial data characterizing the respective driving situation, and
  - a ground truth determination whether a vehicle in the respective driving situation is blocking traffic.

* * * * *